Oct. 12, 1971  F. W. SEEBALD  3,611,600
TRANSPARENCY VIEWING DEVICE

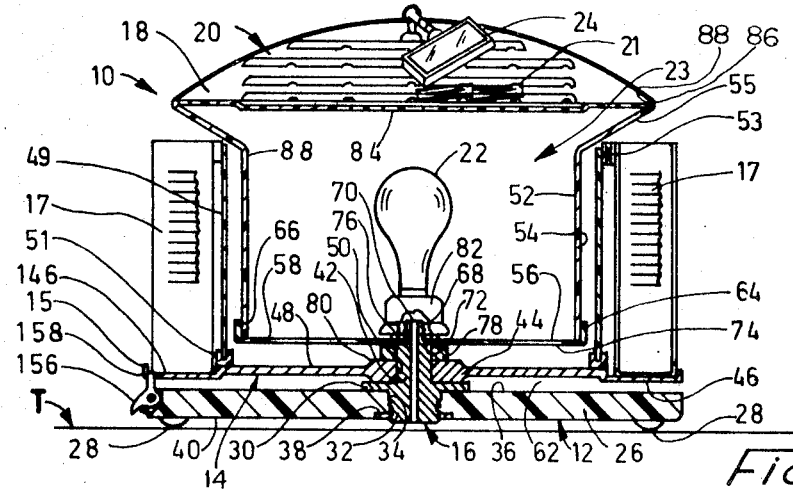

Filed May 28, 1969  2 Sheets-Sheet 2

INVENTOR

BY FRANCIS W. SEEBALD

*Heare, Heare & Sammon*
ATTORNEYS

United States Patent Office 3,611,600
Patented Oct. 12, 1971

3,611,600
TRANSPARENCY VIEWING DEVICE
Francis W. Seebald, 18801 E. Shoreland Drive,
Rocky River, Ohio 44116
Filed May 28, 1969, Ser. No. 828,490
Int. Cl. G09f *13/10*
U.S. Cl. 40—106.1                    15 Claims

ABSTRACT OF THE DISCLOSURE

A device for viewing transparent photographic slides including a base adapted to be mounted on a table or the like. A transparent slide support rack is mounted on the base for supporting a plurality of slide members thereon, and is disposed in overlying relation with respect to a light source to illuminate the respective slides. A turret-like slide storage tray is mounted for rotation on the base enabling storage of a large number of slides on the device itself. A plurality of slide storage cartridges are supported adjacent the periphery of the tray to enable the same to be moved to a readily accessible position for selection of a respective slide or group of slides. The slide support rack includes a plurality of slide receiving receptacles arranged to enable the placement of a large number of slides on the support rack at one time and for facile stacking of the slides for storage in the slide storage cartridges after use.

BACKGROUND OF THE INVENTION

This invention relates to equipment for filing and viewing of transparencies, such as photographic slides or the like. More particularly, it relates to a combination file and viewing device. Heretofore, a number of various devices for viewing photographic transparencies have been provided, but these devices have been limited in their utility often resulting in inconvenience to the person using the device. In addition, many of these viewing devices have no provision for storage on the device itself requiring the slides to be stored in a different location which often results in misplacing of the slides. In those instances where provision for storage has been made, the quantity of slides stored has been extremely limited, and identification and retrieval of the desired slide or slides has been both cumbersome and time consuming. Further, such provisions for holding the slides to be viewed have not enabled the slides to be easily positioned for viewing or stacking after use. Normally, the handling of each slide individually has been cumbersome and has resulted occasionally in damage to the surface of the image-bearing surface of the slides.

SUMMARY OF THE INVENTION

The present invention contemplates an improved device for filing and viewing transparencies, such as photographic slides or the like, and comprises a base on which is supported a transparency support member adapted to support a plurality of transparent slide members thereon. An illuminating means is mounted on the base in illuminating relation with respect to the slide members. A turret-like tray member is movably mounted on the base being adapted to store a plurality of slide storing cartridge members. The turret-like member is rotatably mounted on the base with the cartridge members disposed adjacent the periphery thereof in surrounding relation with respect to the transparency support member so that the respective cartridge members can be moved to a readily accessible position for selection of a slide or a group of slides. The transparency support member includes a plurality of slide receiving receptacles extending in aligned relation transversely thereof, and which are defined in one direction by spaced protuberances for elevating one end of a transparency disposed therein. The receptacles are defined in the other direction by spaced upstanding members to form transversely extending slots including an elongated groove extending lengthwise thereof for facilitating stacking of the slide members after use. An optical means is supported on the base for enlarging the images contained on the transparencies.

By the above arrangement, a large number of slides may be stored on the viewing device itself which may be readily and easily selected for viewing. In addition, the device also provides for placing a large number of slides in a viewing position at the same time. Furthermore, the arrangement of the slide receiving receptacles is such which enables the transparencies disposed thereon to be easily and readily stacked for placement into the cartridge members.

BRIEF DESCRIPTION OF THE DRAWINGS

FIG. 1 is a fragmentary cross-sectional view taken along the line 1—1 of FIG. 2;
FIG. 2 is a fragmentary top plan view of the viewing device of the present invention showing a number of the cartridge members removed therefrom;
FIG. 3 is a fragmentary cross-sectional view taken along the line 3—3 of FIG. 2;
FIG. 4 is a cross-sectional view taken along the line 4—4 of FIG. 3.

DESCRIPTION OF THE PREFERRED EMBODIMENTS

Figure 5:
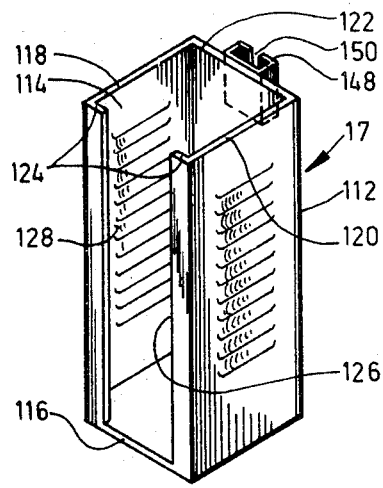
FIG. 5 is a perspective side elevation view of one of the cartridge members of the present invention.

Referring again to FIG. 1, the viewing device of the present invention is illustrated in cross section, generally at 10, FIG. 1, and includes a base 12 which is adapted to be disposed upon a flat surface T, such as a table or a desk top. In the preferred form, a turret-like storage member 14 is mounted for rotation in a generally horizontal plane on a centrally located shaft 16 which is mounted on and extends generally vertically upwardly from the base. The storage member includes a tray 15 to which a plurality of slide storing cartridge members 17 may be detachably connected for easy removal and ready replacement during usage of the device. A transparency support member, such as a rack 18, is fixedly connected adjacent the upper end of the shaft and includes a plurality of slide receptacles 20 for holding the respective slide members to be viewed, such as at 21. An illuminating means 23 is provided including a light source 22, such as an electric light bulb, which may be mounted on the shaft 16 beneath the rack 18 so that the light emanating therefrom will pass upwardly through the rack 18 and the slides disposed thereon. An adjustable optical member 24 may be mounted for selective adjustment above the rack 18 for magnifying the images contained on the respective slide members.

In the form shown, the base 12 comprises a generally flat circular plate 26 which may be made of any suitable rigid material, such as wood, metal, plastic or the like. The plate 26 may be provided with mounting pads 28 affixed to the underside of the plate adjacent the outer periphery to provide a resilient support for the plate and resist sliding movement of the device with respect to the support surface when the device is in use.

The shaft 16 is preferably circular in horizontal cross section and may be affixed to the plate 26 in any suitable manner, but preferably includes an annular flange 30 spaced upwardly from the lower end to provide a lower stub end 32. The plate 26 may be provided with an opening 34 adapted to receive the lower stud end therein so that the flange 30 will overlie the uper surface 36 of the plate. The lower stub end 32 may be threaded to receive a locking nut 38 which is adapted to underlie the underside 40 of the plate whereby threading of the nut on the shaft will pull the flange into tight engagement with the plate to hold the saft securely in place. A stem portion 42 extends upwardly from the flange 30 having a diameter less than the flange and being adapted for journaling in the tray 15 to provide a support shaft therefor.

The tray 15 of the slide storage member 14 is preferably circular in top plan (FIG. 2) being disposed in generally concentric spaced relation above the plate 26. The tray 15 preferably includes a hub 44 which is journaled for rotation on the shaft 16 and which is disposed in sliding engagement with the flange 30. An outer rim 46 is connected to the hub by a web portion 48 being adapted to support the cartridge member 17. The hub 44 includes a generally centrally disposed aperture 50 adapted to receive the stem 42 therein, and preferably has a diameter slightly larger than the diameter of the stem so that the tray 15 may be freely rotated in a generally horizontal plane. The tray 15 may be made of any suitable substantially rigid material, preferably one which will afford minimum frictional contact between the hub 44 and flange 30 as the tray is rotated about the shaft 16. A cylindrical casing 49 may be mounted on the rim 46 in concentric relation to the tray 15. Preferably, the casing has a diameter less than the diameter of the tray to provide mounting space for the cartridge members 17, and may be supported within an annular channel 51. The casing may be provided with generally T-shaped buttons 53 spaced circumferentially thereabout being adapted for detachable connection to the upper ends of the cartridge members 17.

The illuminating means preferably include a reflecting member 52 which may also be affixed adjacent the upper end of the shaft, being adapted to concentrate and direct the light from the light bulb outwardly through the rack 18. In the form shown, the reflecting member 52 comprises a hollow, thin, generally cylindrical shell 54 (FIG. 2). The shell 54 may be flared outwardly adjacent one-half of the upper end, as at 55, being adapted to support the rack 18 and provide greater surface area therefor. Preferably, the shell 54 is supported on a generally circular base plate 56 which may be affixed to the shaft 16. The base plate 56 preferably includes a plurality of openings 58 to enable heat from the light bulb to be dissipated from the inside of the shell. In this regard, the tray 15 may also be provided with a plurality of openings 60 so that the heat may pass through the openings 50 in the plate 56, through the openings 60 in the tray 15, and then radially outwardly through the space 62 between the tray and the base. The shell may be made of any suitable opaque material, preferably from one having relatively high reflective characteristics. Preferably, the shell is detachably mounted on the base plate which is provided with an annular flange 64 projecting upwardly adjacent its outer periphery, thereby defining a recess 66 adapted to receive the lower end of the shell. By this arrangemnt, the shell 54 may be readily inserted and easily removed from within the recess 66 for periodic cleaning and maintenance of the device.

The base plate 56 may be supported on the shaft in any suitable manner, but in the form shown, is disposed in generally concentric relation with respect to the tray 15 and plate 26. As shown in FIG. 1, the length of the stem may be greater than the thickness of the hub so that the stem 42 extends upwardly above the hub 44. The shaft 16 may be provided with an upper stub end 68 having a reduced diameter from that of the stem 42, being adapted to be disposed within a generally centrally located aperture 70 in the base plate 56. The upper stub end 68 and stem 42 together define a shoulder 72 having a maximum diameter greater than the diameter of the aperture 70 and adapted to seatingly engage the underside 74 of the base plate 56. The upper stub end 68 is adapted for threaded engagement with a nut member 76 to securely hold the base plate against the shoulder. To prevent frictional contact between the base plate 56 and the tray 15, a washer 78 having relatively friction-free characteristics may be mounted on the shaft in the space between the hub 44 and base plate 26. The washer 78 may be disposed in loose fitting relation on the stem 52 and preferably has a thickness slightly less than the distance between the upper surface of the hub 80 and the shoulder 72 to limit excessive tilting of the tray with respect to the shaft, prevent contact of the tray with the base plate, and enable free rotation of the tray about the shaft. A light socket 82 may be threadably connected to the upper stub end for supporting the light bulb within the reflecting member and beneath the rack 18.

The transparency support rack 18 may be mounted on the reflecting member 52 for detachable connection adjacent the upper end of the shell 54. As shown, the rack 18 may include a relatively thin screen 84 which is disposed in overlying relation with respect to the light bulb 22. The screen may be made of any suitable translucent material, such as a clear plastic, glass or the like. In the form shown, the screen 84 is preferably disposed in angular relation with respect to the general plane of the base 12, such as at an angle of 30 degrees, to enable the slide member disposed thereon to be viewed while the person viewing is in a seated position, and the device is placed on a desk or table of ordinary height, such as approximately 30 inches. To achieve the angular disposition of the screen, the shell 54 is preferably truncated adjacent the upper end resulting in the screen having a configuration resembling joined semi-circles when viewed in top plan (FIG. 2), whereas, it will actually have a configuration resembling joined semi-ellipses when viewed at right angles to the general plane (not shown). The screen 84 may be mounted on the shell 54 in any suitable manner, but preferably the flared end of the shell 54 is provided with an annular flange 86 conforming to the contour of the outer periphery of the screen which defines a recess 88 adapted to receive the screen therein. The recess 88 preferably has a diameter only slightly greater than the diameter of the screen 84 to provide a snug fit, but still enable the screen to be removed for cleaning and other maintenance purposes. Of course, the screen 84 may be disposed generally parallel to the base with the entire upper end being flared to provide even greater slide holding area.

As indicated, the screen 84 includes a plurality of receptacles 20 which are adapted to support and maintain the respective slide members, such as 21, in viewing position on the screen 84. The receptacles 20 are preferably arranged in aligned side-by-side relation transversely of the screen. Referring to FIG. 3, the opposite sides of each of the receptacles 20 are defined in one direction by a plurality of generally equally spaced, parallel walls 90 which forms a plurality of slots 92 that extend transversely, such as perpendicular, to the lengthwise dimension of the screen. Each of the respective slots 92 includes a pair of rows 94 and 96 having a plurality of projections, such as 98 and 100, respectively (FIGS. 3 and 4) which are disposed in spaced relation, such as equidistant, lengthwise thereof, with each of the rows 94 and 96 disposed adjacent a respective one of the walls 90 on opposite sides of the slot. Preferably, the spacing between the projections in one row is equal to the spacing of the projections in the other row with a projection in one row, such as 98, being laterally aligned with a projection, such as 100, in the opposite row to define the remaining opposite sides of the respective receptacles 20. Preferably, the spacing between the projection in one row should be approximately equal to the length of the slide member so that one end of the slide member will be raised above the other end when the slide member is disposed in position on the screen. More specifically, when one edge, such as the lower edge 102, is disposed adjacent the base of one of the respective projections, as at 104, the opposite or raised end 106 will rest on the crest 108 of the adjacent projection with the raised edge 106 extending outwardly beyond the crest. Each of the slots 92 may also be provided with an elongated groove 110 which extends lengthwise between the opposed rows 94 and 96 of projections. By this arrangement, when the viewer has finished viewing a group of slides, by placing a finger at one end of the groove 110 and running it along the groove, such as from right to left (FIG. 4), the lower edge 102 of a respective slide 20a will slide up the side of the adjacent projection and engage the underside of the overhanging or raised end 106 of the adjacent slide 20b, so that the slides will be automatically stacked and ready to be deposited in the cartridge members 17.

As all of the cartridge members 17 are of generally identical configuration, only one will be described in detail with like parts of the remaining cartridge members being designated by like numerals. Referring now to FIG. 5, the cartridge member 17 includes a body 112 which is open at the top and closed at the bottom, and which is preferably polygonal, such as rectangular in configuration when viewed in top plan (FIG. 2). The body 112 defines a generally vertically oriented slide compartment 114 adapted to receive a plurality of slide members in stacked superposed relation therein. The body preferably includes a base 116 from which opposed side walls 118, 120, rear wall 122 and front wall 124 extend generally vertically upwardly. The front wall is provided with an elongated slot which extends substantially the full length of the body to provide access to the interior of the compartment.

Figure 6:
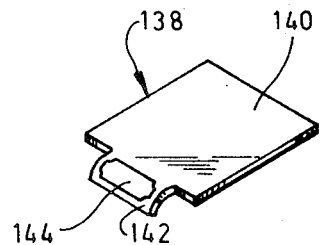
FIG. 6 is a perspective view of a separating slide member which may be utilized with the present invention.
Figure 8:
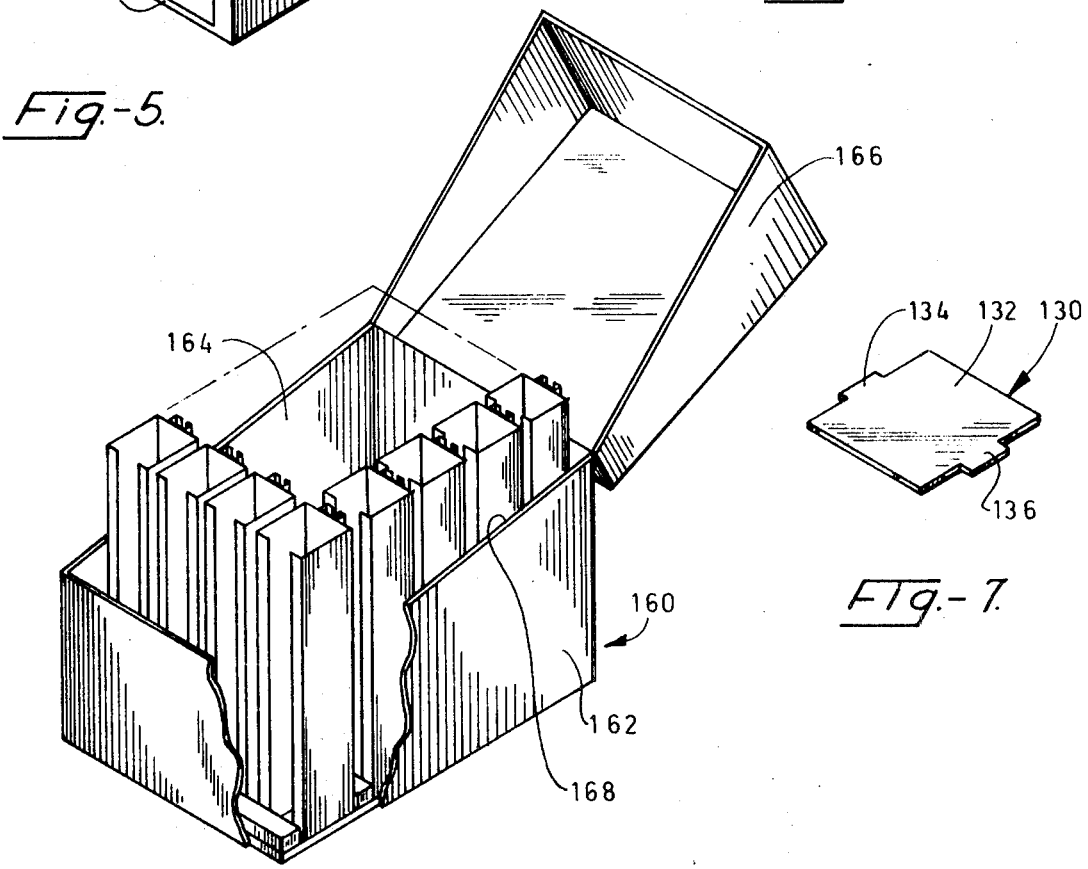
FIG. 8 is a fragmentary perspective view of a container which may be utilized in the present invention.
Figure 7:
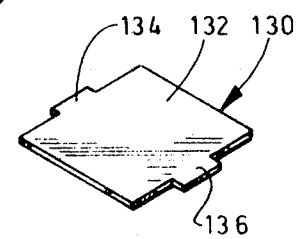
FIG. 7 is a perspective view of a locking slide member which may be utilized with the present invention.

Preferably, each of the respective side walls of the body are provided with generally vertically aligned rows of horizontally extending grooves 128 adapted for locking engagement with a locking slide 130. As shown in FIG. 7, the locking slide includes a body 132 having a configuration substantially identical to the configuration of the slide-receiving compartment of the slide cartridges. A pair of tab members 134 and 136 may project outwardly from opposite sides of the body being adapted to be disposed in snap-action relation within the grooves 128. By this arrangement, the locking slide 130 may be placed on top of a group of slide members contained in the cartridge member, and then, snapped into place to prevent the slide members from being dislodged or otherwise ejected from the cartridge member when the cartridge member is inadvertently dropped or placed in a position other than its normal upright position. Referring to FIG. 6, an indexing or separating slide member 138 may be provided which includes a body 140 having a configuration substantially identical to the other slide members except it may include a tab 142 adapted to project outwardly through the slot 126 in the front wall 124 of the cartridge member 17. Preferably, the tab 142 is provided with an indicia receiving element 144 to record information indicating the nature of a respective group of slides contained in the cartridge member.

To mount the respective cartridge members 17 on the tray, the rim 46 is provided with a plurality of uniformly spaced recesses 146 (FIG. 2) which are preferably confiured identical to the configuration of the base 116 of the cartridge members, such as rectangular, and is adapted to receive and hold the cartridge members on the tray. To further secure the cartridge members on the tray, a channel member 148 (FIG. 5) may be affixed, such as by welding or the like, adjacent the upper end of the rear wall 122 of the body 112. The channel member 148 preferably extends generally vertically downwardly lengthwise of the body 112 and includes a generally T-shaped slot 150 which extends lengthwise thereof for slidably receiving a generally T-shaped hook 152 affixed to the casing, as aforesaid. Preferably, the recesses 144 are arranged in a semi-circular relation on only one-half of the rim 46 to enable the cartridge members 17 to be rotated out of the way of the viewer when viewing a selective group of slide members from the front of the device, as indicated by the arrow 154, a spring-biased latch member 156 may be mounted on the base 12 for selective registration with a notch 158 provided on the periphery of the rim 46 to hold the cartridge members 17 in the aforesaid position.

The optical member 24, such as a magnifying glass 155, is preferably swivelably mounted on the screen 84. The magnifying glass 155 may be supported by an extensible rod 157 to enable the same to be moved to any desirable position above the screen for magnifying the images contained on the respective slide members disposed thereon.

When the cartridge members 17 are not in use, they may be stored in a container 160 which includes a body 162 providing a cartridge receiving compartment 164. The body 162 is preferably provided with a lid 166 for enclosing the cartridge members when stored in the compartment. Preferably, the upper marginal edge 168 of the body is disposed at a height less than the height of the respective cartridge members to expose the upper ends of the cartridge members and enable facile removal of any one of the respective cartridge members when so desired.

I claim:

1. A device for displaying and viewing transparencies, comprising
    a base,
    a transparency support member mounted on said base adapted to support a plurality of transparencies,
    an illuminating means disposed in illuminating relation with respect to said transparencies,
    a turret-like member mounted on and movable with respect to said base for storage of said transparencies,
    said turret-like member is rotatably mounted on said base,
    said transparency support member includes a translucent surface including a plurality of aligned receptacles adapted to hold said transparencies for viewing thereon,
    a plurality of cartridge members mounted on said turret-like member adapted to store a plurality of transparencies therein,
    said base and said turret-like member are disposed in generally concentric relation with respect to one another,
    said cartridge members are disposed adjacent the periphery of said turret-like member in generally surrounding relation to said illuminating means,
    said cartridge members are detachably mounted on said turret-like member and include a generally vertically oriented compartment adapted for storing said transparencies in generally superposed relation with respect to one another, and
    said turret-like member being rotatable with respect to said translucent surface for selecting a particular slide for placement and viewing on said translucent surface.

2. A device in accordance with claim 1, wherein
    said receptacles extend transversely of said translucent surface, and
    said receptacles comprising at least one slot having spaced, elevated portions to raise one end of said transparencies above the opposite end thereof.

3. A device in accordance with claim 1, wherein said receptacles comprise a plurality of slots arranged in aligned side-by-side relationship.

4. A device in accordance with claim 1, wherein
each of said slots including a pair of rows having a plurality of projections spaced lengthwise thereof, and
each of said rows being disposed adjacent a respective one of said walls on opposite sides of said slot.

5. A device in accordance with claim 4, wherein each of said slots includes an elongated groove extending lengthwise thereof to facilitate stacking of said transparencies.

6. A device in accordance with claim 1, wherein said translucent surface is disposed in overlying relation with respect to said illuminating means.

7. A device in accordance with claim 1, wherein said translucent surface is disposed in angular relation with respect to the general plane of said base.

8. A device in accordance with claim 1, wherein
said transparency support member comprises a cylindrical tray,
a hollow, cylindrical shell is mounted on said tray being spaced inwardly from the outer periphery thereof,
said translucent surface being mounted on said shell, and
said cartridge members being disposed outwardly about the periphery of said shell on said tray.

9. A device for displaying and viewing transparencies comprising,
a base,
a transparency support member mounted on said base adapted to support a plurality of transparencies,
an illuminating means disposed in illuminating relation with respect to said transparencies,
a turret-like member mounted on and movable with respect to said base for storage of said transparencies,
said transparency support member comprises a translucent surface including a plurality of aligned receptacles adapted to hold said transparencies for viewing thereon, and
said receptacles extend transversely of said translucent surface being defined in one direction by spaced rows of protuberances for elevating one end of said transparencies.

10. A device in accordance with claim 9, wherein
said receptacles are defined in the other direction by spaced upstanding members to form transversely extending slots,
said slots include an elongated groove extending lengthwise thereof and intermediate said rows for facilitating stacking of said transparencies.

11. A device is accordance with claim 9, including optical means supported by said base for enlarging the images contained on said transparencies.

12. A device in accordance with claim 9, wherein the spacing between the respective protuberances of each row is approximately equal to or greater than the corresponding dimensions of said slide members.

13. A device for displaying and viewing transparencies, comprising
a base,
a transparency support member mounted on said base adapted to support a plurality of transparencies,
an illuminating means disposed in illuminating relation with respect to said transparencies,
a turret-like member mounted on and movable with respect to said base for storage of said transparencies,
a plurality of cartridge members mounted on said turret-like member adapted to store a plurality of transparencies,
said cartridge member is generally polygonal in configuration including spaced oppositely disposed side walls,
each of said side walls including a plurality of vertically aligned indentations, and
at least one locking member including a pair of oppositely disposed tabs adapted for snap action locking engagement within said indentations.

14. A device for displaying and viewing transparencies, comprising
a base,
a transparency support member mounted on said base adapted to support a plurality of transparencies,
an illuminating means disposed in illuminating relation with respect to said transparencies,
a turret-like member mounted on and movable with respect to said base for storage of said transparencies,
a plurality of cartridge members mounted on said turret-like member adapted to store a plurality of transparencies,
said cartridge member includes a front wall,
said front wall including an elongated recess extending in a generally vertical direction for substantially the full length thereof,
a separating slide member adapted to be disposed within said cartridge member including a tab adapted to extend outwardly through said recess, and
indicia receiving means contained on said tabs for determining the contents of a slide or group of slides stored in said cartridge member.

15. A device for displaying and viewing transparencies, comprising
a base,
a transparency support member mounted on said base adapted to support a plurality of transparencies,
an illuminating means disposed in illuminating relation with respect to said transparencies,
a turret-like member mounted on and movable with respect to said base for storage of said transparencies,
a plurality of cartridge members mounted on said turret-like member adapted to store a plurality of transparencies,
a container member,
said container member including a storage compartment adapted to receive a plurality of cartridge members therein, and
said compartment having a transverse height greater than the height of said cartridge when disposed therein.

References Cited

UNITED STATES PATENTS

| | | | |
|---|---|---|---|
| 2,553,160 | 5/1951 | Arps | 40—63 UXA |
| 2,656,758 | 10/1953 | Cole | 40—106.1 X |
| 2,882,628 | 4/1959 | Fowle | 40—106.1 |
| 3,208,456 | 9/1965 | Peebles | 312—184 |
| 3,217,436 | 11/1965 | Van Wormer | 40—106.1 |
| 3,466,126 | 9/1969 | Sakamoto | 40—63 XA |

FOREIGN PATENTS 1,072,838   3/1954   France.

ROBERT W. MICHELL, Primary Examiner

R. CARTER, Assistant Examiner